(12) United States Patent
Herth

(10) Patent No.: US 7,259,327 B1
(45) Date of Patent: Aug. 21, 2007

(54) ELECTRICAL BOX FOR SINGLE FASTENER ATTACHMENT

(76) Inventor: Greg Herth, 10 Tower Mews, Oakdale, NY (US) 11769

( * ) Notice: Subject to any disclaimer, the term of this patent is extended or adjusted under 35 U.S.C. 154(b) by 0 days.

(21) Appl. No.: 11/525,460

(22) Filed: Sep. 22, 2006

(51) Int. Cl.
 *H02G 3/08* (2006.01)
(52) U.S. Cl. .............................. 174/50; 174/58; 174/64; 439/535; 248/906; 220/3.9
(58) Field of Classification Search ................. 174/50, 174/58, 64, 17; 220/3.9, 3.3, 3.4, 3.5, 3.6, 220/3.92; 439/535; 248/906
See application file for complete search history.

(56) References Cited

U.S. PATENT DOCUMENTS 4,214,668 A * 7/1980 Neff et al. .................... 220/3.3
5,833,110 A * 11/1998 Chandler et al. ............ 220/3.9
6,573,446 B1 * 6/2003 Umstead et al. .............. 174/50

* cited by examiner

Primary Examiner—Dhiru R. Patel
(74) Attorney, Agent, or Firm—Alfred M. Walker

(57) ABSTRACT

Electrical boxes are attached to a beam using a single fastener, such as a screw or nail. The boxes may be old for work, new work, dual purpose and for dual purpose vertical or horizontal attachment to a vertical beam. The fastener used is guided through a hole in an interior bracket setting the fastener at an appropriate oblique angle to exit at the beam attachment hole on the exterior side. To prevent rotation while using a single fastener, molded extending tabs are provided on the mounting wall to properly align the box with the beam to which the box is to be attached. The tabs prevent the box from being rotated on the fastener during the fastening process. After box attachment, the tabs are folded over and torn off at their weakened attachments.

6 Claims, 4 Drawing Sheets

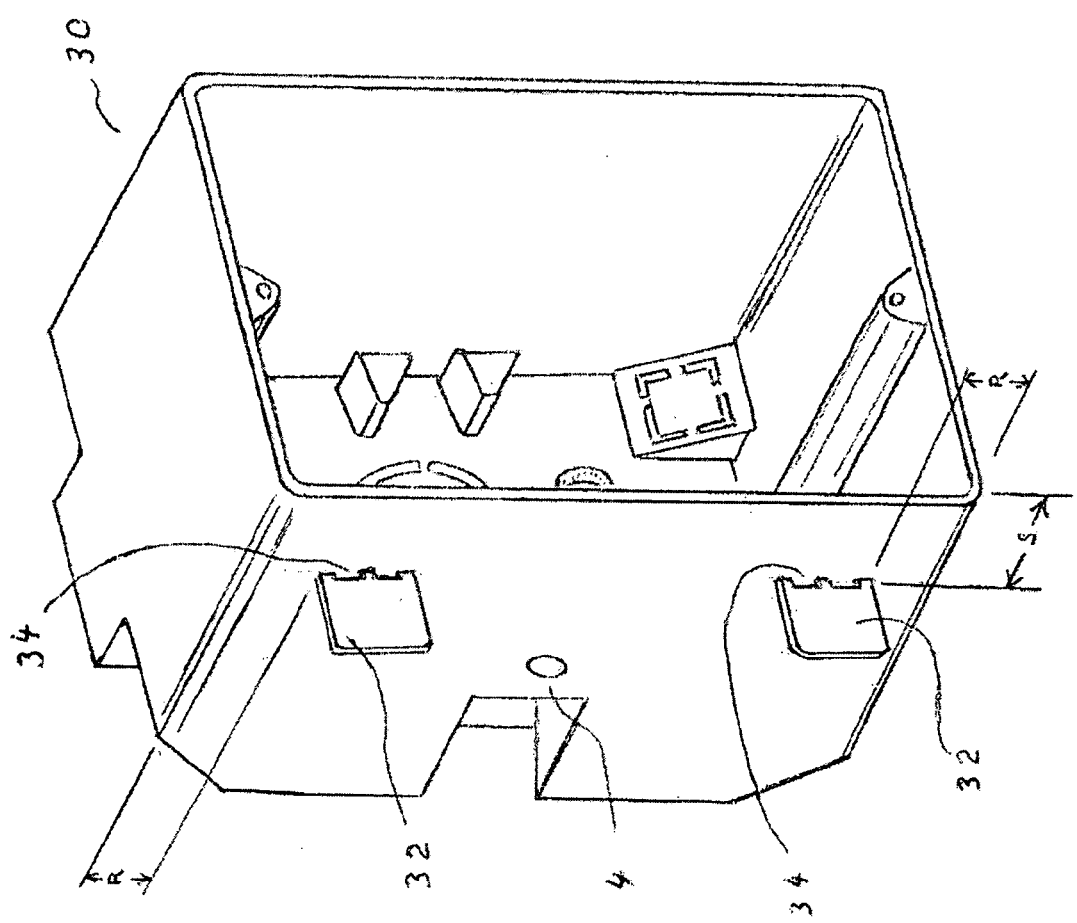

ELECTRICAL BOX FOR SINGLE FASTENER ATTACHMENT

FIELD OF THE INVENTION

The present invention relates to electrical boxes for new or old work having a single fastener for mounting.

BACKGROUND OF THE INVENTION

Electrical boxes for either new or old work are usually attached to supporting structures using two fasteners separated apart along a side. The usual method of attachment involves alignment of the electrical box with a frame post, such as a beam or sheet rock surface and then the attachment of one of the fasteners at least partially. Realignment and use of the second fastener follows. Boxes designed for new work typically have fastener bosses extending outward from the sides of the box precluding their use for old work where a sheet rock wall preexists the installation.

Among prior art patents, U.S. Pat. No. 6,093,890 of Gretz relates to a mounting device on an electrical or low voltage box which facilitates attachment to the underside of a sheet rock wall through an opening sized for the periphery of the box to permit use for new work.

U.S. Pat. No. 5,600,093 of Herth and Davis and U.S. Pat. No. 6,943,295 of Herth describe dual purpose electrical or low voltage boxes using interior mounting brackets guiding a fastener at an angle to exit the box wall for attachment to a beam. These boxes are equally useful for new or old work since the attachment is to a frame post, such as a wall stud or beam.

None of the prior art boxes are equipped with anti-rotation and alignment features which permit the efficient attachment to a frame post, such as a beam or stud, with a single fastener.

OBJECTS OF THE INVENTION

It is therefore an object of the present invention to provide electrical boxes for new or old work having a single fastener for mounting.

It is also an object of the present invention to provide an electrical box equipped with anti-rotation and alignment features which permit the efficient attachment of the box to a beam with a single mounting fastener.

Other objects which become apparent from the following description of the present invention.

SUMMARY OF THE INVENTION

In keeping with these objects and others which may become apparent, the present invention provides electrical boxes which are designed to be attached to a frame post, such as a beam or stud using a single fastener, such as a screw or nail. Embodiments are presented for old work, new work, dual purpose and for dual purpose vertical or horizontal attachment to a frame post, such as a vertical beam, for example, a wall frame post, or to a horizontal beam. The fastener used is guided through a hole in an interior bracket setting the fastener at an angle (30-60 degrees to the open front face) to exit at the beam attachment hole on the exterior side. This feature is well described in U.S. Pat. Nos. 5,600,093 and 6,943,295 of the present inventor. Although the fastener of choice is a self-tapping or wood screw, nails can also be used. Besides saving fasteners, the single fastener feature saves time in driving the actual fasteners as well as in alignment of the electrical box.

For new work, an electrical box must be aligned with the side of a beam with the open face extending about ½" beyond the beam edge to account for the sheet rock which will be later applied. The electrical box of the first embodiment has two molded extending tabs on the mounting wall which are set back to properly align it with the beam when the side is against the side of the beam and the two extending tabs are against the forward edge of the beam. Since the tabs are on either side of the single centered fastener, they also prevent the box from being rotated on the fastener during the fastening process. It is very convenient to hold the box with one hand while using a power screwdriver with the other to quickly fasten the box with no care needed for alignment or prevention of rotation from screwdriver torque. After box attachment, the tabs are folded over and torn off at their weakened attachments.

For new work, the set back tabs are not incorporated, however, one or two similar tabs aligned with the forward edge of the open face of the electrical box are used. Thus, the box is simply pushed through a hole in the sheet rock sized to accept the perimeter of the box adjacent to a beam until the tabs are flush with the exterior surface. Then the single fastener between the tabs is applied to fasten the box with no fear of misalignment or rotation during attachment. The tabs are folded and torn off after installation.

For a dual purpose embodiment of the single fastener electrical box, both sets of tabs are supplied. For new work, the pair of front tabs are folded and torn off before installation, while for old work, the two set-back tabs are removed before installation.

In another embodiment, two fastener brackets are supplied, but only one is used for a particular installation. This is a universal design for new work or old work, and also for normal vertical mounting to a vertical beam or for horizontal mounting to a vertical beam (or vertical mounting to a horizontal beam). One fastener bracket is centered on the long edge as described for the embodiments above. Two sets of tabs along the long side are used as for the dual purpose embodiment. A second fastener bracket is located just to the side of the face plate bracket on a short side closer to the long side with the fastener bracket. Two set-back tabs are attached at the extreme ends of the short side. One flush-mounted tab on the opposite side of the face plate bracket is also used. For new work using vertical attachment, all three flush tabs are removed prior to installation, but the unused set-back tabs can remain since they cause no interference. For old work, all four set-back tabs are removed prior to installation, but even better alignment and stability is afforded by all three flush tabs during installation; they are removed after attachment.

In one embodiment of the attachment of the tabs at the box juncture, a very thin central section along the interface with full width edge columns is used to insure the integrity of the 90 degree angle to the box side while insuring easy removal. A bend of less than 90 degrees will sever the short edge columns propagating tear into the thin central attachment which is then easily torn by a twisting motion.

After attachment by a single fastener, rotation of the electrical box around the fastener is resisted by friction of the box against the beam to which it is attached. To assist the frictional resistance to rotation, one or more optional short conical protrusions on either side of the fastener exit hole are molded into the exterior box surface. On a wooden beam, these points or nibs will embed into the beam surface affording additional rotation resistance. Once the face plate is installed, this too will resist any rotational tendency.

In a preferred embodiment of the single fastener electrical box of this invention, it is equipped with two set-back tabs a short distance from the top and bottom corners to avoid the rounded edge. These tabs are perforated at their attachment for easy removal by bending and twisting, or by the use of a utility knife. The tabs are used for new work only. For old work, they are removed prior to installation in a tight fit precut hole in the wall surface adjacent to a beam. The fit of the electrical box in the hole is adequate to resist any rotational tendency.

Note that all electrical boxes of this invention can be easily reset to match any additional surface wall treatment such as tile or wood paneling that has substantial thickness. This is simply done from the outside of the wall by removing the one fastening screw, pulling the box out flush with the new wall surface, and then reattaching the screw to the beam in a new location farther forward.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
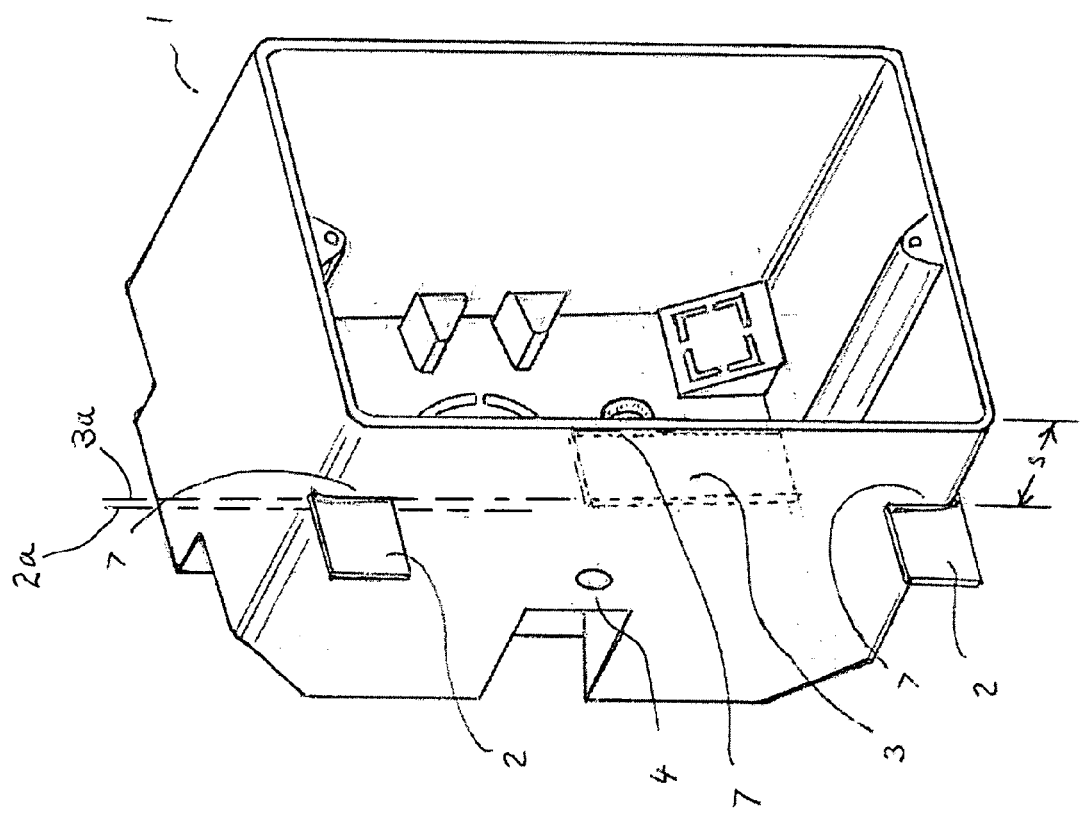
FIG. 1 is a perspective view of a single fastener electrical box of this invention for new work showing the edge placement of flush tabs for old work boxes in phantom.
Figure 2:
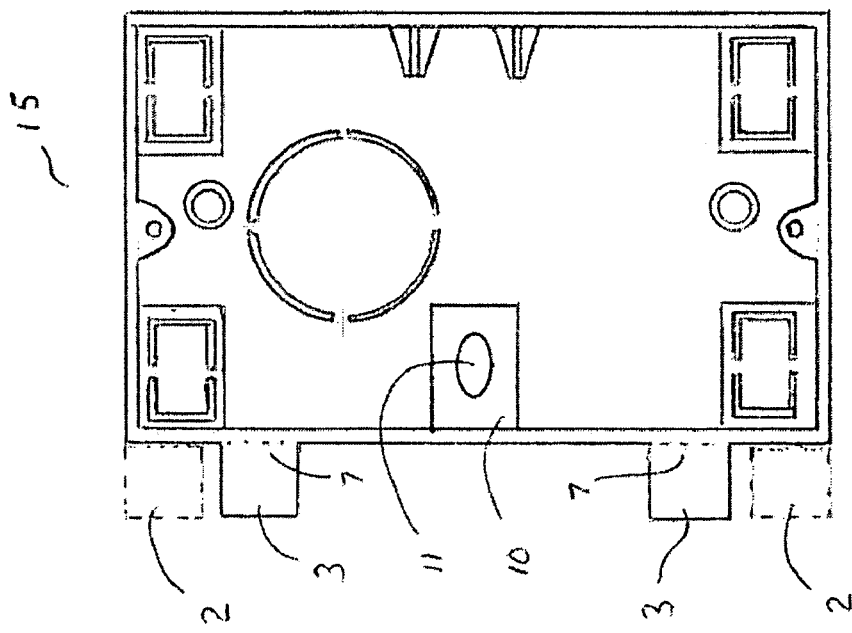
FIG. 2 is a front view of a single fastener electrical box for new work.

The single fastener attachment electrical box of this invention uses an internal fastener bracket which positions the fastener to exit the side of the box to enter the beam at an angle. Electrical box 1 is shown in FIGS. 1 and 2 with set-back tabs 2 at a distance "s" from the front edge to accommodate sheet rock 3a, as shown by the phantom line in FIG. 1, of similar thickness (e.g. ½"). The interface 7 between box and tab is easily broken and/or torn off, but it maintains tabs 2 at a right angle to the side surface. Hole 4 is the angled exit hole for the tip of the fastener. Tab 3, shown in phantom, illustrates the location flush with the open edge of the box of a tab not used in this embodiment. This embodiment (also in FIG. 2) is for new work for attachment of electrical boxes to beams prior to installation of sheet rock. Bracket 10 with fastener hole 11 positions the fastener preferably at a 45 degree angle to the plane of the open face of box 1. For installation, box 1 is set with its fastener wall against the side of a beam or frame post 2a with tabs 2 resting against the orthogonal front edge of the beam or frame post 2a shown in phantom in FIG. 1; then the fastener is applied, and tabs 2 are removed. Thus tabs 2 align box 1 in rotation and set-back while resisting rotation during fastening.

Figure 3:
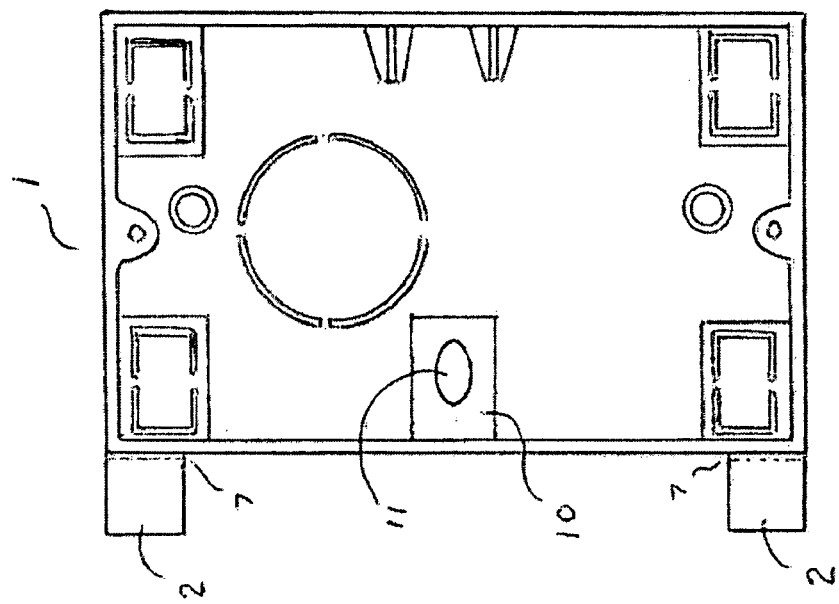
FIG. 3 is a front view of a single fastener electrical box for old work showing additional set-back tabs in phantom that would convert the box to universal use.

FIG. 3 shows a single fastener box 15 of this invention for old work. It has two tabs 3 mounted flush with the front opening. Although a single flush tab 3 as shown in phantom in FIG. 1 can be used, better alignment and anti-rotation resistance is afforded by the pair of flush tabs 3 shown here. In operation, box 15 is simply inserted through a perimeter-matched sheet rock hole adjacent a beam until tabs 3 rest against the outer surface of the sheet rock 3a. Then the fastener is applied, and tabs 3 are removed. If the set-back tabs 2 (shown in phantom) are also supplied on this box, it would be a dual purpose box useful for either old or new work. The unused set of two tabs is just removed prior to use.

Figure 4:
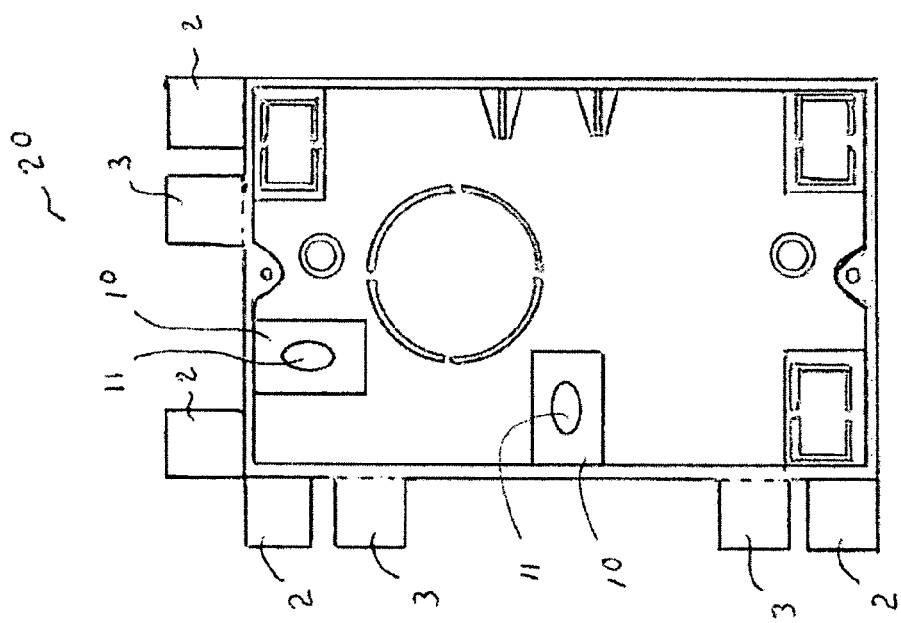
FIG. 4 is a front view of a single fastener box for universal use including horizontal attachment to a vertical beam.

FIG. 4 shows a configuration for a universal embodiment permitting even horizontal attachment to a vertical beam. Here a second fastener bracket 10 is attached to the short wall of box 20 to permit attachment against this wall if desired. While two set-back tabs 2 are added to the short wall, only one additional flush tab 3 is required since for old work attachment along the short wall, the long wall tabs 3 will also provide alignment and rotation resistance. For new work, all three flush tabs 3 are removed prior to installation, but unused set-back tabs 2 need not be removed since they do not interfere with installation.

Figure 5:
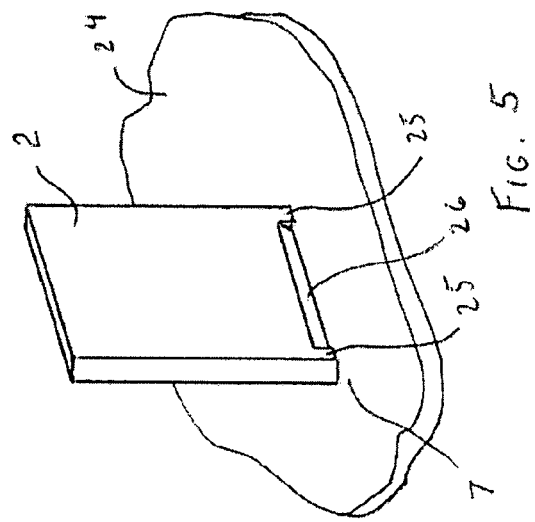
FIG. 5 is a detail showing a set-back tab attachment interface to the side of an electrical box.

FIG. 5 shows an enlarged detail of the interface 7 of a tab 2 with the exterior box surface 24. In this embodiment it is designed as shown to accurately position tabs at 90 degrees to wall while permitting easy removal. The central interface section is molded with a depression 26 (from both sides) to leave a very thin attachment section like a living hinge. This leaves full thickness edges 25 which form short columns of attachment resisting folding. However these columns can be easily overpowered (broken) by folding at about 60 degrees; this will propagate a crack into the thin section setting it up for easy tearing by a twisting motion. The same design of the interface at the front edge for tabs 3 is used.

Figure 6:
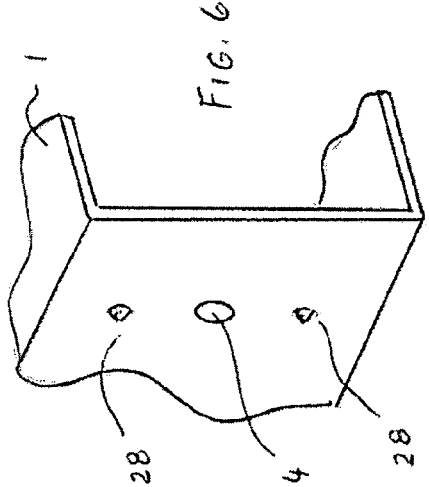
FIG. 6 is a detail showing the use of conical protrusions or nibs on either side of the fastener mounting hole on the exterior box side surface; and, FIG. 7 is a perspective view of the preferred embodiment of this invention.

FIG. 6 shows a pair of conical protrusions 28 emanating from the box wall a short distance on either side of fastener exit hole 4. These are used optionally to further resist rotation on the fastener after attachment, but before a face plate is installed. In this period, only friction between box and beam resists rotation. Points 28 will embed into a wooden beam surface to further resist any rotation. There is no chance for rotation after a face plate is installed.

In the preferred embodiment of this invention, as shown in FIG. 7, box 30 has only two set-back anti-rotation tabs 32 which are set a short distance "R" from the top and bottom edge to avoid the rounded corners. The perforated attachment 34 is thereby easier to cut with a utility knife since the knife is more easily aligned with tabs 32 attached in this position. These tabs are used for new work for alignment and anti-rotation, but they are removed prior to use for old work. Although no surface-mounted anti-rotation and alignment tabs are used in this embodiment, an experienced worker adept at making tight-fit wall board holes adjacent to beams would find no problem installing this electrical box. The fit of the box within the hole is sufficient to resist rotation, and the front of the box is easily aligned with the wall surface.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. An electrical box designed to be attached to a frame post using a single fastener comprising:

a box having a top wall, a bottom wall parallel to said top wall, said top and bottom walls connected by a pair of opposite side walls and a rear wall;

said walls forming a hollow interior with a front open face;

one of said walls being a frame post mounting wall having only a single angled fastener bracket located inside of said electrical box with a bore therethrough accommodating only a single fastener as the sole means of joining said box to said frame post;

an anti-rotation means comprising a plurality of tabs on the mounting wall to rest against said frame post for aligning said box to said frame post and preventing rotation of said box during installation of said fastener, each of said tabs having a perforated attachment to interface with said mounting wall allowing each of said tabs to be broken or torn off.

2. The electrical box as in claim 1 wherein said frame post is a vertically extending wall stud.

3. The electrical box as in claim 1 wherein said frame post is a horizontally extending beam.

4. The electrical box as in claim 1 further comprising at least one short conical protrusion being provided onto an exterior box surface of said electrical box, said at least one protrusion embedding into said frame post to resist rotation of said electrical box during fastening of said electrical box to the frame post.

5. The electrical box as in claim 1 wherein said pair of tabs are set back a short distance from a top and bottom edge respectively of said electrical box to avoid rounded corners for easier removal prior to installation by a utility knife or by tearing.

6. The method for using the electrical box as in claim 1 for old work comprising the step of:

removing one of said tabs before installing said electrical box.

\* \* \* \* \*